I. N. PANGLE.
Combined Animal and Insect Traps.

No. 153,722.

Patented Aug. 4, 1874.

WITNESSES.

INVENTOR

UNITED STATES PATENT OFFICE.

ISAAC N. PANGLE, OF WHITESBURG, TENNESSEE.

IMPROVEMENT IN COMBINED ANIMAL AND INSECT TRAPS.

Specification forming part of Letters Patent No. 153,722, dated August 4, 1874; application filed May 5, 1874.

*To all whom it may concern:*

Be it known that I, ISAAC N. PANGLE, of Whitesburg, in the county of Hamblin and in the State of Tennessee, have invented certain new and useful Improvements in Combined Fly, Animal, and Fish Trap; and do hereby declare that the following is a full, clear, and exact description thereof, reference being had to the accompanying drawings and to the letters of reference marked thereon, making a part of this specification.

The nature of my invention consists in the peculiar construction and arrangement of a trap with certain devices which render it universal in its application for catching insects as well as animals, as will be hereinafter set forth.

Figure 1:
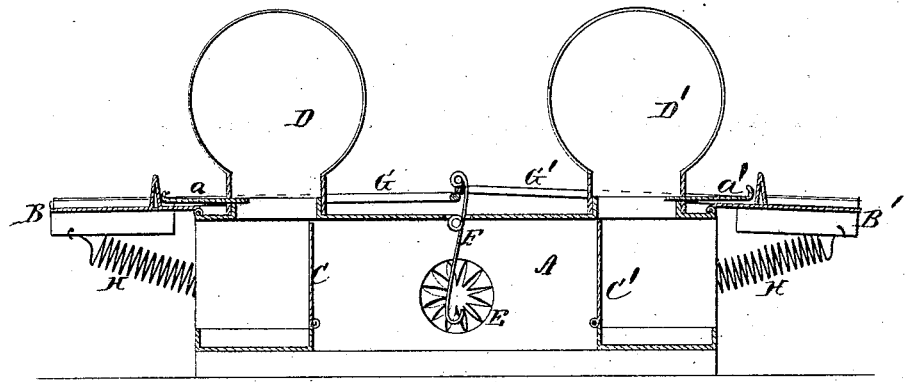
Figure 2:
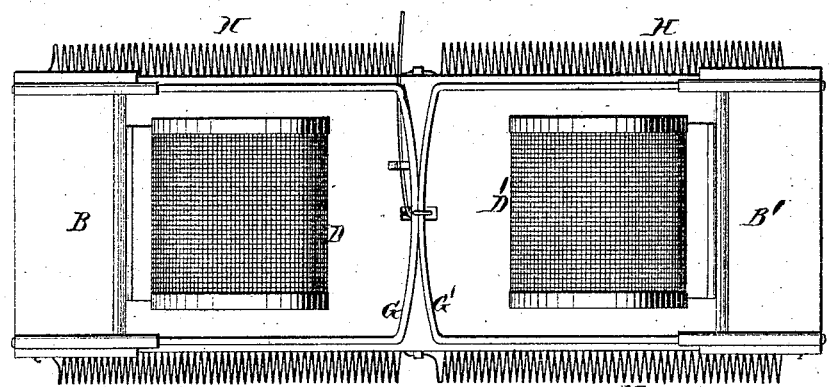
Figure 3:
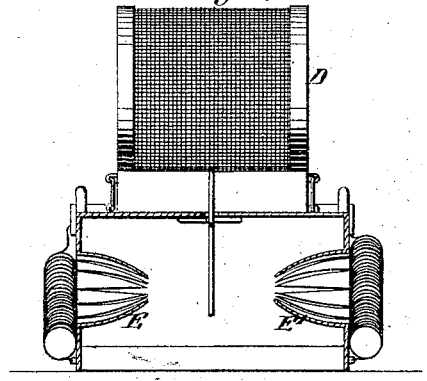

In the annexed drawings, Figure 1 represents a longitudinal section of one form of trap. Fig. 2 is a plan view of same trap. Fig. 3 is a cross-section.

In the drawings, A represents a box-trap with hinged doors at each end, marked B B'. These doors are kept down by means of the spring H H when the trap is not set. Connected to the doors are two loops or lever-arms, G G', which meet about the center of the trap, and are caught, when the trap is to be set, by means of the trigger F. C C' represent two partitions, which are hinged to the bottom of the trap near its ends. When these partitions are raised to a vertical position they form doors for dividing the box into separate compartments. D D' represent two cylindrical fly-boxes which are covered with gauze-wire. Their bottoms are open, and cover openings in the upper side of the trap. These open ends of the boxes, however, may be closed by suitable slides $a$ $a'$. E E' represent openings in the side of the box A, which are surrounded by a series of tapering metallic springs. These springs project inward, as seen in Fig. 3, being slightly curved, and are pointed at their ends, said ends nearly approaching each other.

In using the box-trap for catching flies the partitions C C' are raised, so that the insects cannot reach the center compartment of the trap. The slides $a$ $a'$ are drawn so that they can enter the gauze-covered boxes D D'. These boxes are baited with sugar or any other fly-attracting sweet substance. When the flies pass into these boxes or into the chamber beneath it the doors B B' are sprung by an operator, they having, of course, been previously set. The insects are thus confined within the trap and pass up into the boxes D D', if they have not already done so. The slides $a$ $a'$ are then pushed in so as to cover the lower ends of the boxes D D', and, the flies being thus confined, the boxes are removed from the trap, and they (the flies) can be destroyed.

When using the trap for mice or rats, &c., only the partitions C C' are dropped to a horizontal position, so that they may enter to the center of the box, where the trigger with the bait is located. The trap is set by the operator and sprung by the animal, as usual.

Having thus fully described my invention, what I claim as new, and desire to secure by Letters Patent, is—

The box A, with the spring-doors B B', and the boxes D D', with their slides and valved partitions C C', combined and arranged to operate as and for the purpose set forth.

In testimony that I claim the foregoing I have hereunto set my hand this 6th day of April, 1874.

ISAAC N. PANGLE.

Witnesses:
C. L. TOMLINSON,
W. R. WHITE.